Nov. 30, 1926. 1,608,678
H. F. SMITH
METHOD AND APPARATUS FOR PURIFYING GAS
Filed Sept. 30, 1921 3 Sheets-Sheet 1
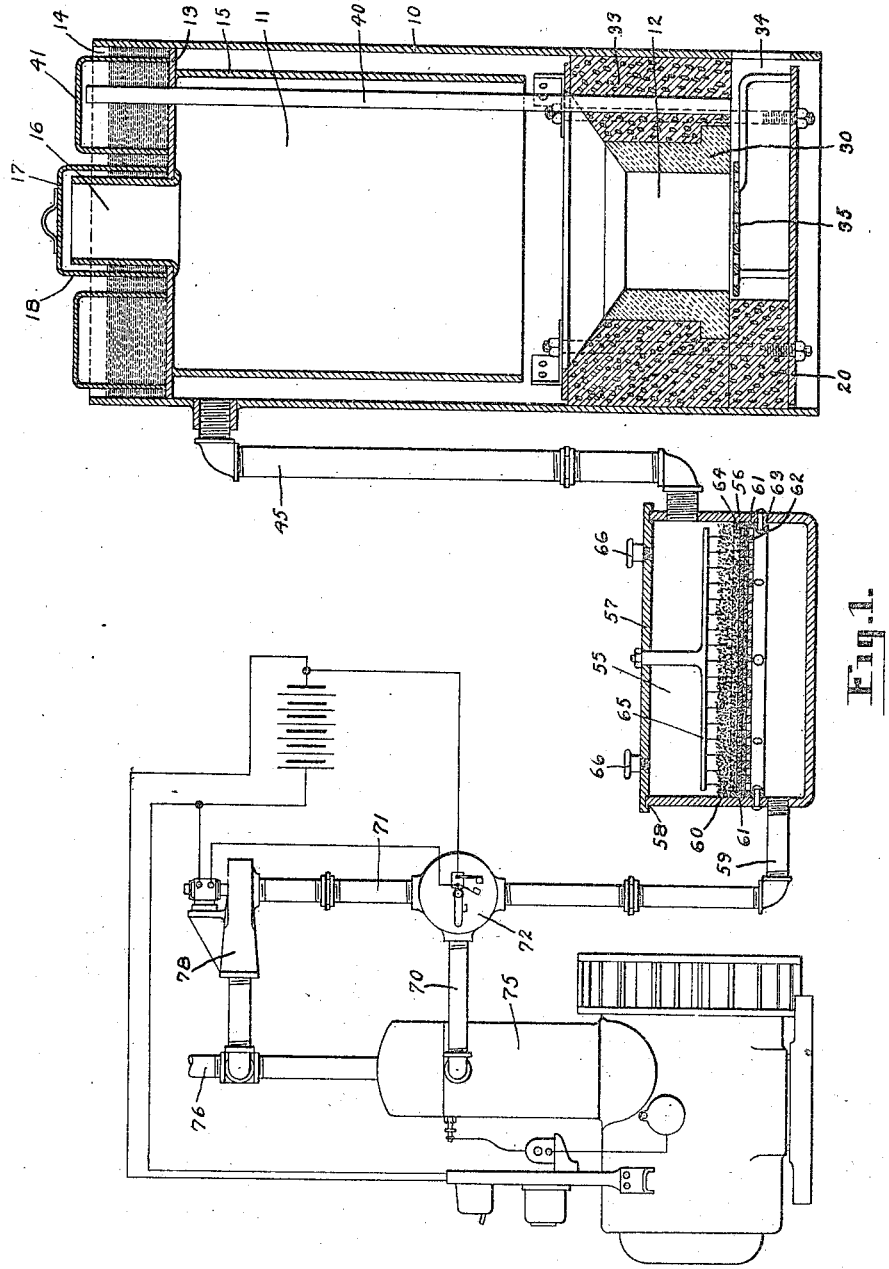

Nov. 30, 1926.
H. F. SMITH
1,608,678
METHOD AND APPARATUS FOR PURIFYING GAS
Filed Sept. 30, 1921    3 Sheets-Sheet 2
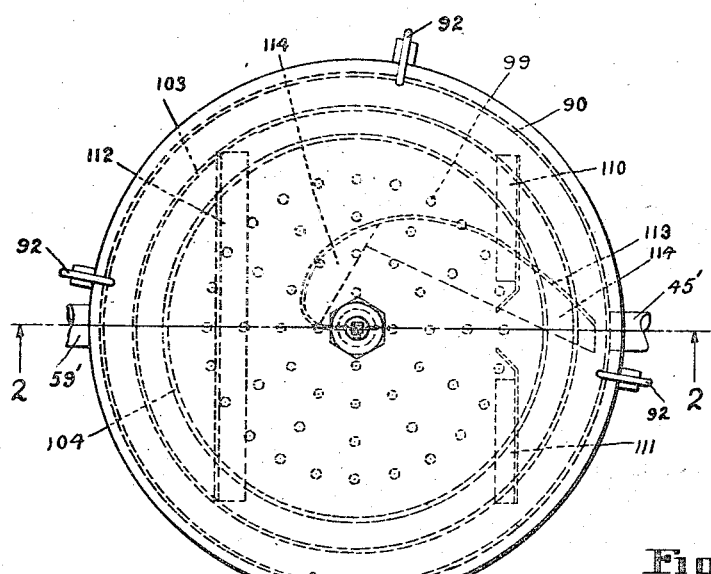

Nov. 30, 1926.

H. F. SMITH

METHOD AND APPARATUS FOR PURIFYING GAS

Filed Sept. 30, 1921    3 Sheets-Sheet 3

1,608,678

Witnesses
Edmund C. Sylvis.
Charles E. Greene.

Inventor
Harry F. Smith

By Geer Maurice
Attorney

Patented Nov. 30, 1926.

1,608,678

UNITED STATES PATENT OFFICE.

HARRY F. SMITH, OF DAYTON, OHIO, ASSIGNOR TO THE GAS RESEARCH COMPANY, OF DAYTON, OHIO, A CORPORATION OF OHIO.

METHOD AND APPARATUS FOR PURIFYING GAS.

Application filed September 30, 1921. Serial No. 504,269.

This invention relates to gas generation, and more particularly to an improved method of removing impurities from gas, and to apparatus for carrying that method into effect.

One of the principal objects of the invention is to provide an improved method of removing impurities from gas, such a gas, for example, as producer gas, and apparatus for carrying that method into effect.

Other objects and advantages of the invention will be apparent from the description thereof set out below when taken in connection with the accompanying drawing.

In the drawing, in which like characters of reference designate like parts throughout the several views thereof, Fig. 1 is a view of a complete gas generating system, comprising purifying apparatus embodying this invention;

Fig. 2 is a sectional view, showing a slightly modified form of purifying apparatus, along the line 2—2 of Fig. 3;

Fig. 3 is a plan view of this modified form of apparatus;

Fig. 4, is a detail view of one element of the purifier shown in Figs. 2 and 3;

Figure 7:
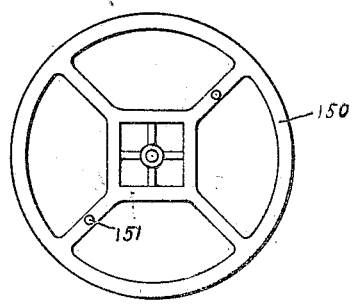
Fig. 7 is a detail view of one element of the modification shown in Fig. 6.

This application is a continuation, in part, of the application of Harry F. Smith Serial No. 398,749 filed July 24, 1920. And Fig. 1 of the drawing is a duplicate of the drawing filed with that copending application. That copending application discloses purifying apparatus constructed in accordance with this invention, and the method of effecting the cleaning of gas through the utilization of that purifying apparatus, the purifying apparatus forming merely one element of the complete system disclosed therein. While the invention forming the subject matter of this application is of general application, it is thought that a clearer understanding of the invention will be secured through a description of it in connection with the same type of gas generating system as forms the subject matter of the original application.

As shown in Fig. 1, the purifier is associated with a gas generator, which consists of a metallic shell 10, housing an upper zone or fuel reservoir 11, and a lower zone or generating chamber 12. The upper end of the shell is closed by means of a suitable top 13, so positioned as to provide a water pan or trough 14 from which moisture is supplied to the generating chamber during operation of the producer. The top 13 is also provided with an upstanding flange surrounding an opening 16 through which fuel is introduced into the reservoir, a cover 17, having a depending flange 18 adapted to extend down into the water within the trough 14 to effect a seal, being provided for closing this opening during operation of the producer. The lower zone, that housing the generating chamber 12, is provided with suitable lining, this lining preferably consisting of a layer of firebrick 30, of small heating capacity, backed by a layer of heat insulating material 33. The lower end of the producer is closed, and the lining thereof is suitably supported by means of a plate 20, held in place by any desired means, the means shown being preferable, since it minimizes conductivity of heat from the plate into the producer shell. An ash pit 34 connected with the generating chamber 12, is provided, a removable grate 35 being positioned within the ash pit to support the fuel bed within the generating chamber. A depending flange 15 is provided within the upper zone of the producer, this flange being spaced from the shell 10, and serving as a fuel reservoir. An inverted trough like member 41, cooperating with the pan or trough 14 serves as a vaporizer, receiving heat from the generating chamber, or the generated gas, to vaporize some of the water within the trough, this vapor passing through the pipe 40 to the ash pit 34, whence it is taken up by the ingoing blast of air and carried into the generating zone. The producer thus operatively described is the same as that described in the copending application above referred to. A producer of this type is not essential in connection with the invention forming the subject matter of this particular application, impurity containing gas, generally, being susceptible of purification by means of this invention.

The gas from the off-take pipe 45 passes into the purifier 55 which consists of a metallic pan 56 having a top 57, which top has a groove 58 therein adapted to receive the upper end of the pan 56 to constitute a substantially gas tight joint therewith. In the modification shown the off-take pipe opens into the purifier 55 near the top and the gas escapes therefrom through the pipe 59, which opens out of the purifier near the bottom. Interposed between the inlet and the outlet of the purifier is a layer 60 of very finely divided or finely pulverized material. Preferably the layer 60 is of the same material as that which constitutes the fuel upon which the producer is operated; slack coal, for example, being finely pulverized for this use. Thus that part of the fuel which would otherwise be useless in the operation of the producer is utilized and in addition a liberal supply of material for the purifier is thus at all times available. The material used in the purifier, however, may or may not be of the same character as the fuel used in the producer, as other properly divided or pulverized material will function satisfactorily. This layer of material is supported upon a partition member consisting of two perforated metallic plates 61 having interposed between them a layer 62 of filamentous material, such as flannel or other cloth. This supporting member rests upon a flange 63, attached to the wall of the purifier, and is retained in place by means of a spring ring 64 which is positioned in contact with the upper perforated plate 61. As the gas passes downwardly through the layer of pulverized material any impurities therein, such for instance as tar, are separated from the gas and deposited upon the upper surface of this layer of material.

It is not enough that this material be divided into small particles, in the ordinary sense, but it must be finely divided. For material of the size ordinarily used in gas purifiers, such as sawdust, is entirely too large to prove effective. And charcoal of this same order of size is also ineffective. Where charcoal or coal is used satisfactory results seem to be attained when the carbonaceous material is so divided that all of it will pass through a twenty mesh screen. Preferably a large part is so finely divided that it will pass through a sixty mesh screen, and much of it will pass through a screen as fine as one hundred mesh. This is about the same as what is known commercially as "powdered coal" but these proportions are not essential, and satisfactory gas may be attained where these proportions do not exist.

It is to be borne in mind that the impurities normally present in producer gas generated from a fuel such as charcoal, coke, or the like, are of two general types,—(a) gaseous or vaporous impurities, such as hydrogen sulphide and other gaseous compounds, and (b) discrete particles such as sulphur dust, very finely divided charcoal or coke dust, semi-solid or liquid particles such as heavy tar, and the like. These latter impurities are the ones which give real trouble in the operation of an engine, and the purifier described herein is primarily designed for removing impurities of this general character. It is old to use charcoal, or like, filters; but actual operation has shown the ineffectiveness of any of the known types of charcoal, sawdust, clinker, or the like, filters in the removing of these solid or semi-solid impurities. Of course, there is some removal of both the above types of impurities in the ordinary charcoal or sawdust purifier; but there is not a sufficient removal of the particularly objectionable smoke or fume type of impurities to permit of satisfactory operation of the engine over a considerable period. It has been found that the filtering material should be so finely divided that the particles of such divided material shall have dimensions which are of the same order or magnitude as the particles of impurity to be removed from the gas. By securing particles of this small size the interstices within the layer of purifying material are of such size that the particles of impurity do not pass through.

For a given rate of flow of gas through the purifier, per unit area thereof, the thickness of the layer of purifying material should vary with the character of that material to give a predetermined differential pressure across the purifier pad. In the gas generating system shown herein, the purifier has an effective diameter of about 18 inches and gas passes therethrough at the maximum rate of approximately 360 cubic feet per hour. In such operation it is found that a differential pressure across the filter pad of substantially three inches of water causes satisfactory cleaning. To secure this predetermined differential the thickness of the layer of purifying material is varied according to the sizing of the material therein. With material so finely divided that most of it will pass through a 200 mesh screen a thickness of one quarter of an inch will suffice. With material all of which will pass through a 40 mesh screen, and over a 60 mesh screen the thickness should be half an inch. In connection with a producer of the character described herein the layer 60 preferably has a surface area of about nine times the surface area of the producer grate.

Where fuel such as charcoal or coke is used within the producer the amount of impurity carried by the gas is comparatively small and a layer of finely pulverized material will function satisfactorily for a considerable period of time. As impurities, particularly tar, are deposited upon the purifying material, however, it tends to form a gummy and impervious layer thereon which increases the resistance to the flow of gas through the purifying material and tends to render it ineffective as a separator. It therefore becomes necessary to either place a new supply of material within the purifier or to so treat the material already therein as to return it to its original effectiveness. One method of restoring the effectiveness of this material, when it becomes coated with tar, is to agitate it to break up the surface coating. In order to accomplish this result a rake-like member 65 is attached to the top 57, the teeth of which extend into the layer of material. Rotation of the top 57 to drag the teeth of the rake member through the material will so agitate that material as to break it up to restore it to its original condition. Handles 66 are attached to the top 57 to facilitate rotation thereof. When the producer is operated on a fuel, such as bituminous coal, which generates a gas rich in tar it is generally more satisfactory if the layer of pulverized material be changed from time to time, without any attempt to restore its effectiveness by agitating it through operation of the rake. Since the material within the purifier is itself carbonaceous, it is found that, when large quantities of tar are being separated from the gas, this material and the separated tar may be readily briquetted and the resulting briquettes used in the producer as fuel. Thus waste products which are present in connection with the operation are utilized. Of course, the rake 65 may be dispensed with, if desired, and new material added from time to time as needed to replace the old material.

And if desired the filamentous or fabric member 62 may be made in the form of an endless belt, so that by advancing the belt fresh material may be moved into operative position and the used material moved into a position where it may be treated to restore its effectiveness, or briquetted for subsequent use in the producer as fuel.

The purified gas passes off through the pipe 59 to any desired place of use or storage. As shown in the drawing the pipe 59 has a two way valve 72, connected thereto, the outlet ports of this valve being connected respectively to the inlet pipe 70 of an internal combustion engine 75, forming a part of a Delco-light house lighting plant, such as is fully described in the patent of Charles F. Kettering and William H. Cryst No. 1,341,327 dated May 25, 1920, and to the vent pipe 71, which is in turn connected to the exhaust pipe 76, a starting blower 78, of any desired character, being inserted within the pipe 71.

As stated above, impurities are deposited upon the purifying material, during the cleaning operation, forming a gummy layer upon the upper surface of the purifying material. This deposited layer consists of a mixture of finely pulverized fuel, which is introduced, to a greater or less extent, into the generating chamber along with the fuel charged thereto, admixed with tar. If this layer of deposited material is removed, the original purifying material will be found unimpaired in effectiveness. Where the rake described above is utilized this layer is merely broken up, so that the original layer of purifying material is again exposed. In the form of apparatus shown in Figs. 2 and 3 this layer of deposited material is entirely removed, by being scraped off of the top of the original purifying material. And as often as such a layer forms, and a new layer will be formed each time the producer is operated, it may be removed to restore the effectiveness of the purifier. It is not necessary that this layer be removed after each operation of the purifier, however, for the producer ordinarily operates, several days, at least, before the increased resistance due to the depositing of this material within the purifier seriously affects the operation.

As shown in Fig. 2 the purifier comprises a metallic pan 90, having a top 91 therefor the top and pan being held in position by means of spring clamps 92. The top is provided with a groove within which suitable packing material 93 is inserted to make a tight joint and prevent leakage. The gas to be cleaned passes into the shell through the pipe 45', and out through the pipe 59'. Attached to the end of the outlet pipe 59', within the purifier shell, is a fitting 94, the upper end of which is cone shaped. Located within the purifier is a pan 95, the bottom of which has an opening therein surrounded by an upstanding flange 96, which is conical in shape to cooperate with the conical member 94. When the device is in assembled position the pan 95 is supported upon the outlet pipe 59', the conical shaped member 94 extending into the opening surrounded by the flange 96, the construction being such that the resulting joint is gas tight. Positioned within the pan 95 is an inverted cup shaped member 97, the free edge of which seats upon the bottom of the pan 95 and is rigidly attached thereto, preferably in gas tight connection, the attachment in the construction shown being formed by welding the two parts together. Supporting legs 98 are also provided, these legs being welded at opposite ends to the pan 95 and the member 97. This member 97 has a plurality of holes or perforations 99 therein, a screen, 100, of wire mesh being positioned over these holes and held in place by suitable means, such as soldering or spot welding. A layer of fabric 101, such for instance as the flannel described above, is positioned on top of the screen 100 this fabric being held in position by the spring band 102. This spring may be of any desired construction, such as the type of coil spring which is ordinarily used for closing screen doors. The specific construction of this spring is therefore not shown. The upstanding wall 103 of the member 95, and the depending wall 104 of the member 97 are spaced a substantial distance apart, the depth of the member 95 being greater than the depth of the member 97. The pan 95, during operation, contains a finely divided or pulverized purifying material, 60', this material forming a layer of substantially uniform thickness over the member 97, and filling the trough between the flange 103 and the depending flange 104.

As the gas passes in through the inlet pipe 45', thence through the layer of purifying material, and out through the pipe 59', any impurities contained therein are deposited upon the upper surface of the layer of purifying material. In order to facilitate a uniform depositing of this material over the entire surface of the layer 60', the top of the purifier is provided with a series of baffle plates. As shown, particularly in Fig. 3, there are three of these plates. The plates 110 and 111 are positioned a short distance in front of the inlet opening, to which the pipe 45' is connected, and substantially transverse to the direction of flow of the incoming gas. These plates are spaced apart a sufficient distance to allow most of the incoming gas to pass freely between their ends, but to strip off the outer layers of the gas and cause the gas thus separated to eddy or circulate within the space located between these baffle plates and the wall of the purifier. The third baffle plate 112 is arranged substantially parallel to the two smaller baffle plates and is correspondingly positioned upon the opposite side of the purifier housing. The gas which passes between the baffles 110 and 111 contacts with this plate 112 and is caused to circulate within the space between the two sets of baffles. Some of the gas passes beneath the plate 112 into the space between that plate and the wall of the purifier. All of the baffle plates are so arranged that they are at all times above the surface of the layer of purifying material. This construction is such that the gas, containing the impurities is caused to pass through the layer of purifying material in such wise that it deposits these impurities over the surface of the layer 60' in a substantially uniform layer.

Each time the producer is operated therefore, a layer consisting of finely divided fuel admixed with tar, and the like, is deposited. As the number of deposits increases the resistance to flow through the purifier correspondingly increases, and this resistance will build up until the effectiveness of operation of the device is interfered with. In order to strip off these deposited layers, at such time, a scraper member, is provided, which member is so proportioned that it will scrape across the entire surface of the purifying layer, its curvature being such that it will force the material which is scraped from the top of the layer of purifying material over the edge of the pan 94, into the bottom of the shell, whence it can be removed as desired. This scraper consists of a curved metallic member 113 having wooden plates 114 attached thereto, which carry teeth 115, of the character described above in connection with Fig. 1. The end of the metallic member is extended and positioned within a slot in the operating shaft 116, a suitable set screw holding the two in assembled position. The shaft 116 extends outwardly through the top 91, a supporting and packing means indicated generally by the numeral 117, being provided. The outer end of the shaft is constructed to receive a suitable operating handle or tool, not shown, whereby it may be rotated to cause the scraper member to correspondingly rotate to both break up the surface of the layer of purifying material and at the same time remove any excess material.

Where this type of purifier is used the fuel introduced into the generating chamber of the producer is not as carefully screened, to remove finely divided fuel as is the case in the type of purifier illustrated in Fig. 1. In fact substantial quantities of finely divided material may be purposely introduced into the generating chamber along with the fuel, so that the layer of material deposited upon the main body of the purifying material, the layer 60', will contain, proportionately, considerable quantities of solid fuel. The resulting layer will then be less sticky and gummy than is the case when the finely divided fuel is more carefully screened out before the fuel is introduced into the generating chamber. And these layers may be more easily removed, therefore.

It is sometimes found that, during operation of the apparatus the layer of purifying material will settle or pack so that the scraper member will not function to remove all of the material deposited thereon. In such case as this, the teeth on the scraper member are especially beneficial. Of course the teeth may be dispensed with if desired.

Figure 5:
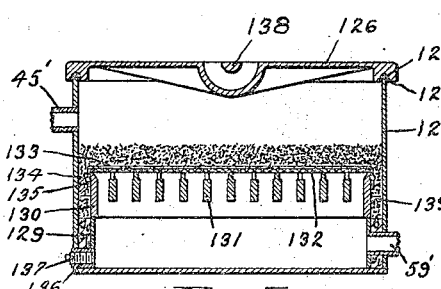
Fig. 5 is a sectional view of another modified form of purifier.

In Fig. 5 is shown a modified form of cleaning apparatus. This comprises a metallic shell or pan 125, having a top 126 therefor, which top is provided with a groove 127, adapted to receive the upper edge of the shell or pan 125, suitable packing material 128 being inserted within said groove to make a tight joint and prevent leakage of gas or air therethrough. Positioned within the bottom of the shell or pan 125 is a supporting ring 129, preferably welded to the bottom of the member 125, the upper edge of this ring having a ground surface to receive a correspondingly ground surface on the lower face of the grid member 130, which serves to support the purifying material. This grid, preferably, consists of a cylindrical sleeve, one end of which is open, the other end being provided with a plurality of cross bars 131, to which is soldered or spot welded a screen member 132. This preferably consists of a layer of Monel metal filter cloth, although it may be of conventional wire mesh, or may be perforated plates of the character described above in connection with Fig. 1. This screen may be attached to the grid member 130 in any other desirable or suitable way, but attaching it by spot welding constitutes one of the easiest and most effective ways of securing it. Supported upon the screen 132 is a layer of filamentous material 133, such as flannel or other cloth, which is held in place and properly stretched by means of the spring 134, which is of the type described above in connection with Fig. 2 and is snapped into the groove 135, thus holding the cloth 133 properly positioned and stretched, at the same time allowing ready removal thereof. Purifying material, of the character described above is supported upon this cloth.

Especially where the purifier is used in connection with a producer furnishing gas to an internal combustion engine, particularly when that engine is closely connected to the purifier, it is found that pulsations or vibrations occur as a result of the operation of the engine, which tend to agitate the purifying material causing it to draw away from the shell of the purifier. In a purifier such as disclosed in Fig. 1 this sometimes causes trouble. For if the purifying material draws away from the shell a sufficient distance it will permit the passage of gas through the purifier without that gas being forced to pass through the layer of purifying material. Therefore the cleaning effectiveness of the device will be impaired. In order to take care of this condition the purifier shown in Fig. 5 has the supporting grid 130 spaced from the shell 125, this space being filled with purifying material. Even though the purifying material tends to draw away from the shell, therefore, the gas will, nevertheless, still pass through the layer of purifying material. Preferably the ring 129 is also spaced from the shell of the purifier, this space being filled with a material such as concrete, which serves to support the layer of purifying material. If desired the concrete may be dispensed with and purifying material used to fill this space.

The gas is introduced into the purifier, above the layer of purifying material, through the pipe 45', and passes out from the purifier, from below the purifying material, through the pipe 59'. A drain 136, provided with a removable plug 137 is provided in the bottom of the purifier for draining off any moisture and impurities that may collect therein. The top 126 is provided with a handle 138 for easy manipulation thereof. In order to facilitate removal of the grid, for purposes of cleaning, it is provided with a plurality of lugs or hooks 139 adapted to receive a suitable tool or hook for lifting this grid from the purifier.

Figure 6:
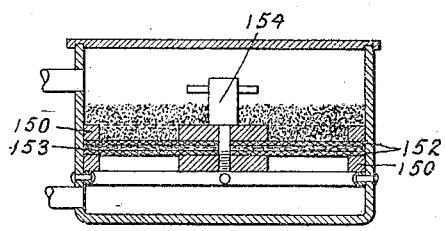
Fig. 6 is a sectional view of still another form of apparatus.

In Figs. 6 and 7 is shown still another form of purifier, in which grids 150 are substituted for the perforated screens or plates 61, of the modification shown in Fig. 1. These grids may be of any desired shape, so long as the effective opening through them is quite large to permit the free passage of gas, but the form of grid shown functions satisfactorily. If desired one of these grids may be provided with pins 151, constructed to cooperate with corresponding holes, not shown, in the other grid, to properly position them relative to each other. Interposed between the two grids, and sustained by them, are two layers of wire screen, 152 or other perforated material, between which is positioned a layer 153 of filamentous material, such as flannel, of the character described above. The two grids, with the screens and layer of cloth between them, are held firmly together by means of the member 154, which as shown, consists of a bolt passing through a centrally arranged opening in each of the grids, the end of the bolt being threaded within the opening in the lower grid. The head of the bolt is adapted to contact with the upper grid, so that when the bolt is tightened the two grids with the screen and layer of cloth between them are tightly fastened together. The layer of filtering material is supported upon the unitary structure thus described. This particular structure is advantageous in that it facilitates renewal of the layer of filtering material, and facilitates removal of the grids, and associated screen and cloth. Because of the construction the grids, etc., with the purifying material thereon, may be lifted bodily from the shell or pan of the purifier.

Figure 9:
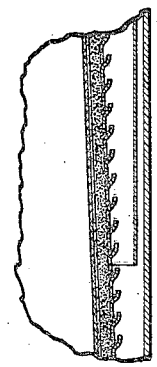
Fig. 9 is a detail view of still another form of construction.
Figure 8:
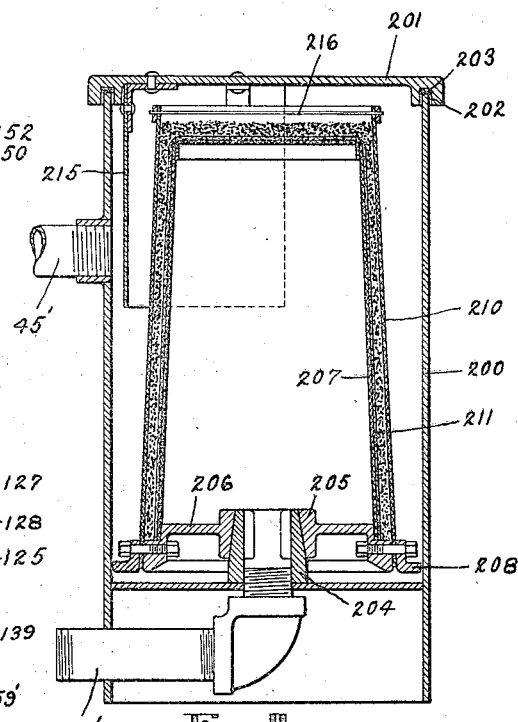
Fig. 8 is a sectional view of another modification of the purifier.

In Fig. 8 is shown still another form of purifying apparatus. In the modifications above described the purifier shell is cylindrical in form but is more in the nature of a pan, in that it has substantially greater diameter than height. The modification shown in Fig. 8 is also cylindrical, but the shell 200 has substantially greater height than diameter. This shell has a top 201 therefor, which as in the modification described above, is provided with a groove 202 for receiving the upper end of the shell, suitable packing material 203 being inserted within the groove to make a tight joint. The gas to be cleaned passes into the shell through the pipe 45', and passes out through the pipe 59'. As in the constructions above, the layer of filtering material is interposed between the inlet and the outlet pipes. But in this particular modification the construction is such as to facilitate and make particularly easy the renewal of the filtering material. The inner end of the outlet pipe is conical shaped, as shown at 204, this conical shaped end being constructed to cooperate with a correspondingly shaped opening 205 in the base of the member 206. Supported upon the member 206 is a member 207 which is perforated and which corresponds in function with the lower perforated plate 61, of the modification shown in Fig. 1; that is it serves to support the filtering material. The member 206 has a clamping flange 208 cooperating therewith which serves to clamp to that member a hollow member 210 which is of a shape corresponding to the member 207, being spaced a suitable distance therefrom and if desired open at its upper end, its lower end being also open and firmly held between the member 206 and the flange 208. The member 210 is preferably made of wire mesh or screen, the size of openings therein being dependent upon the fineness of the purifying material. Satisfactory operation has been attained with purifying material all of which passes over a sixty mesh screen, the member 210, being made of forty mesh screen. Of course the member 210 should be such that the purifying material will be retained therein, and in actual practice this occurs when the above dimensions are present. If desired the member 210 may be perforated, a flannel covering being provided therefor. Or it may have louvers therein, as shown in Fig. 9 so that the gas may readily pass therethrough. The member 207 has cooperating therewith a layer or stocking of filamentous material 211, which, as in the modifications above, is preferably of wool or flannel. The members 206, 207 and 210 are so proportioned that a space of suitable dimensions, is provided between them to receive the purifying material which is of the same character as that described above.

By means of the construction described renewal of the purifying material is rendered a very simple matter. In order to renew this material the top 201 is removed, and the members 206, 207 and 210, which, for purposes of convenience in description are designated as a cartridge for receiving the purifying material, are removed as a unit. This cartridge being removed is inverted, and the fouled purifying material dumped therefrom after which it is filled with new material and replaced in the purifier shell. The conical shaped end 204 of the outlet pipe and the hole 205 have their cooperating surfaces finished to form a ground joint so that leakage therethrough is prevented. In replacing the charged cartridge it is inserted into the purifier and positioned with the conical member 204 within the cooperating hole 205, thus supporting it.

A baffle plate 215 is attached to the top 201 and when in position is interposed between the purifier cartridge and the gas inlet. The incoming gases, especially where the purifier is located quite closely to the gas generator, may be very hot and the baffle not only prevents direct impingement of these gases on the cartridge and inclosed purifying material, but causes these gases to travel around in contact with the shell 210 and thus cools them.

A bail or handle 216 is carried by the cartridge to facilitate its removal from, or insertion into, the shell 210.

With a purifier of the type shown in Fig. 8 it is not necessary that the purifying material be renewed whenever the cleaning efficiency falls off. In this type of apparatus the impurities tend to collect upon the outer surface of the member 210, from which they may be removed whenever desirable. Brushes constructed for movement to sweep the surface member 210 may be provided. Or the starting blower, shown in Fig. 1, may be reversed to cause a current of air to flow through the purifier in a direction reverse to the direction of flow of the gas to blow the layer of deposited impurity from the surface of the member 210. Another method of removing the layer of impurity is to hold open the inlet valve of the engine so that an explosion impulse will act thereon. In practice it is found that very often there will be an impulse of this character set up whenever the engine stops, which impulse is sufficient to blow the layer of impurities free. Where this type of impulse occurs the efficiency of the purifier will be automatically restored at the end of each period of operation. Also, except when there is a large proportion of tar in the deposited impurities, there is a maximum thickness to which the deposit will build up. Any further material deposited will drop off thus maintaining a definite resistance to flow and a definite cleaning effectiveness. But there should be a layer of purifying material, of sufficient thickness to cause satisfactory cleaning, originally provided in the purifier, the deposited material being merely added to this original layer. While in the various types of purifiers, as set out above, the sizing of the purifying material may vary over a substantial range, it is generally found that most satisfactory operation will be secured if this material is so sized that the particles of impurity to be removed from the gas are slightly smaller than the particles of the purifying material.

While the method herein described, and the forms of apparatus for carrying this method into effect, constitute preferred embodiments of the invention, it is to be understood that the invention is not limited to this precise method and forms of apparatus, and that changes may be made in either without departing from the scope of the invention which is defined in the appended claims.

What is claimed is:

1. The method of removing from producer gas or the like the impurities which normally exist therein as discrete particles of solid and liquid character, which consists in first applying upon a sustaining fabric a layer of purifying material in which the dimensions of the particles of material are of the same order of magnitude as the particles of material being removed and then passing the impurity-laden gas through a continuously maintained layer of such finely divided material supported upon such sustaining fabric.

2. Purifying apparatus of the character described for removing from producer gas or the like the impurities which normally exist therein as discrete particles of solid and liquid character, which comprises a housing having an inlet for the impurity-laden gas and an outlet for the clean gas, a layer of fabric within said housing and interposed between the said inlet and outlet, and a continuously maintained layer of finely divided material upon said fabric to constitute a purifying layer, said material being composed of particles the dimensions of which are of the same order of magnitude as the particles of impurity to be removed from the gas.

3. Purifying apparatus of the character described for removing from producer gas or the like the impurities which normally exist therein as discrete particles of solid and liquid character, which comprises a housing having an inlet for the impurity-laden gas and an outlet for the clean gas, a layer of fabric within said housing and interposed between said inlet and outlet, and a layer of finely divided material applied upon said fabric before the passage of a substantial quantity of impurity-laden gas to constitute a purifying layer, said material being composed of particles the dimensions of which are of the same order of magnitude as the particles of impurity to be removed from the gas.

4. Purifying apparatus of the character described for removing from producer gas or the like the impurities which normally exist therein as discrete particles of solid and liquid character, which comprises a housing having an inlet for the impurity-laden gas and an outlet for the clean gas, a layer of fabric within said housing and interposed between the said inlet and outlet, a continuously maintained layer of finely divided material of substantially uniform thickness upon said fabric to constitute a purifying layer, said material being composed of particles the dimensions of which are of the same order of magnitude as the particles of impurity to be removed from the gas, and means for removing from the surface of the layer of purifying material the impurities deposited thereon without removing the normal layer of purifying material.

5. Purifying apparatus, of the character described, for removing from a gas, such as producer gas, the impurities which exist therein in the form of smoke, which impurities normally exist in the gas as discrete particles; which comprises a housing having an inlet for the impurity laden gas, and an outlet for the purified gas; a perforated partition within said housing, and interposed between the said inlet and outlet openings thereof the perforations within said partition being sufficiently large to permit free passage of gas therethrough; a layer of finely divided carbonaceous material, upon said perforated partition, the dimensions of the particles constituting this layer being of the order of magnitude of the particles of impurity to be removed from the gas, and of considerably smaller size than the perforations within the partition; and a layer of fabric carried by said perforated diaphragm, and positioned to support the layer of finely divided carbonaceous material, the construction of the fabric being such that free passage of the gas therethrough is permitted, but passage of the finely divided purifying material is prevented.

6. Purifying apparatus, of the character described, comprising a housing having an inlet pipe opening thereinto; an outlet pipe extending into said housing and terminating in a conical supporting member; a perforated partition, constructed to support a layer of purifying material, and a supporting member therefor having an opening therein defined by a conical wall constructed to cooperate with the conical end of the outlet pipe, to support the said perforated partition in assembled position, with the perforated partition and layer of purifying material thereon intermediate the inlet and outlet openings.

7. A purifying apparatus comprising a housing having an inlet and an outlet, whereby a fluid to be purified may be passed through said housing; a partition within said housing, said partition consisting of two perforated metallic diaphragms having a layer of fabric therebetween; and a layer of finely divided charcoal on said partition; the arrangement being such that all fluid passing through the housing will pass through the partition and layer of charcoal.

8. A purifying apparatus for removing impurities from a gas, such as producer gas, comprising a housing having an inlet and an outlet; a bed of finely divided carbonaceous material within said housing, interposed between said inlet and said outlet, the construction being such that when impurity laden gas is passed through said housing the impurities are removed therefrom and deposited over the surface of the purifying material to form a layer which tends to increase the resistance to flow of the gas through the purifying material; and a scraper member positioned in scraping relation with the normal surface of the layer of purifying material and provided with a plurality of agitating teeth, for breaking up and removing the layer of deposited impurity, to restore the purifying material to its original effectiveness, without interrupting the operation of the apparatus.

9. A purifying apparatus for removing impurities from a gas, such as producer gas, comprising a housing having an inlet and an outlet; a bed of finely divided carbonaceous material within said housing, interposed between said inlet and said outlet, said bed of purifying material being adapted to remove impurities from the gas passing therethrough and to retain those impurities largely upon the surface first presented to the gases, and a scraper member provided with agitating teeth, associated with said surface, for breaking up and removing the layer of deposited impurities to restore the purifying material to its original effectiveness without interrupting the operation of the apparatus.

10. A purifying apparatus, for removing impurities from gas such as producer gas, in which the impurity laden gas is passed through a layer of purifying material, consisting of finely divided carbonaceous material, which comprises a housing; an inlet pipe opening into said housing; an outlet pipe, extending into said housing, the end of said pipe within said housing terminating in a conical supporting member; a cartridge comprising spaced perforated cylindrical walls mounted upon a base member having an opening therein defined by a conical flange constructed to cooperate with the conical end of the outlet pipe, the cartridge being constructed to contain a layer of finely divided purifying material within the space between the spaced walls, so that the cartridge and purifying material therein may be inserted in, or removed from, the housing as a unit, the construction being such that when in assembled position, gas passing into the housing from the inlet pipe, and out from the housing through the outlet pipe, passes through the layer of purifying material within the cartridge.

11. A purifying apparatus, for removing impurities from gas such as producer gas, in which the impurity laden gas is passed through a layer of purifying material, consisting of finely divided carbonaceous material which comprises a housing; an inlet pipe opening into said housing; an outlet pipe, extending into said housing, the end of said pipe within said housing terminating in a conical supporting member; a cartridge comprising spaced perforated walls mounted upon a base member having an opening therein defined by a conical flange constructed to cooperate with the conical end of the outlet pipe, the cartridge being constructed to contain a layer of finely divided purifying material within the space between the spaced walls, the construction being such that when in assembled position, gas passing into the housing from the inlet pipe, and out from the housing through the outlet pipe, passes through the layer of purifying material within the cartridge; and means whereby the cartridge may be inserted into or removed from the housing.

12. The method, in the removing of impurities from a gas, such as producer gas, while such gas is passing from the generating chamber of the producer to a gas engine, for causing operation of that gas engine; which consists in operating the gas engine to cause passing of the gas through a bed of finely divided purifying material, the impurities being removed from the gas and deposited upon the bed of purifying material, to form a layer of impurities thereon which increases resistance to flow of the gas through the bed of purifying material to lower its cleaning effectiveness; and, from time to time, subjecting the layer of purifying material to an explosion impulse, resulting from combustion of the gas within the engine cylinder, to agitate the layer of deposited impurities, to restore the cleaning effectiveness of the bed of purifying material.

13. The method, in the removal of impurities from a gas, such as producer gas; which consists in passing the gas through a maintained bed of finely divided purifying material, the impurities being removed from the gas and deposited upon the bed of purifying material, to form a layer thereon which increases resistance to flow of the gas through the bed of purifying material to lower its cleaning effectiveness, the surface of the bed of purifying material being arranged at an angle, with respect to the horizontal, which is greater than the angle of repose of the deposited impurities, so that the deposited impurities will automatically drop off, thus maintaining a substantially uniform resistance to flow of the gas through the purifying material.

14. A purifying apparatus for removing impurities from a gas, such as producer gas, comprising a housing having an inlet and an outlet; a perforated member therein, a layer of fabric, such as flannel cloth, upon said perforated member, a layer of purifying material, consisting of finely divided carbonaceous material upon the layer of fabric, and a second perforated member cooperating with the layer of purifying material, to retain that purifying material in place, the particles of purifying material being slightly larger than the particles of impurity to be removed thereby, and the construction being such that the perforated member, the fabric member and the layer of purifying material, when in assembled position, are located between the inlet and outlet openings of the housing.

15. Purifying apparatus, of the character described, for removing from a gas such as producer gas, the impurities which exist therein as smoke or fume, which impurities normally exist therein as discrete particles and in which the impurity laden gas is passed through a layer of purifying material, consisting of finely divided carbonaceous material, which comprises a housing; an inlet pipe opening into said housing; an outlet pipe extending into said housing, the end of said outlet pipe within said housing terminating in a conical supporting member; a base member, having an opening therein defined by a conical wall constructed to cooperate with the conical end of the outlet pipe, to support the said base member, a perforated plate carried by said base member and adapted to support a layer of finely divided purifying material, the particles of said material being of considerably smaller size than the perforations in said plate, and a layer of filamentous material, such as flannel cloth, carried by said perforated plate, and adapted to directly support the purifying material, the said layer of filamentous material being of such character as to permit the free passage of gas therethrough, but to prevent the passage of the finely divided purifying material, the construction being such that when in assembled position gas passing into the housing through the inlet pipe, and out from the housing through the outlet pipe, will pass through the layer of purifying material.

In testimony whereof I hereto affix my signature.

HARRY F. SMITH.